Patented Feb. 9, 1926.

1,572,586

UNITED STATES PATENT OFFICE.

HELEN GILLETTE WEIR, OF NEWARK, NEW JERSEY, ASSIGNOR TO THE PREST-O-LITE COMPANY, INC., A CORPORATION OF NEW YORK.

COMPOSITION FOR STORAGE-BATTERY ELECTRODES AND PROCESS OF MAKING THE SAME.

No Drawing.    Application filed November 6, 1923. Serial No. 673,160.

*To all whom it may concern:*

Be it known that I, HELEN GILLETTE WEIR, a citizen of the United States, residing at Newark, in the county of Essex and State of New Jersey, have invented certain new and useful Improvements in Compositions for Storage-Battery Electrodes and Processes of Making the Same, of which the following is a specification.

This invention relates to improvements in active materials for electrodes of storage batteries of the lead-sulfuric acid type. A particular object of the invention is to regulate the porosity and coherence of the active material by an improved utilization of a lead salt, especially the sulfate, as one of its constituents.

Numerous processes have heretofore been suggested for producing lead sulfate in materials to be made active. The end in view is usually two-fold; first to utilize the sulfate as a means for obtaining porosity, and second, to bond the material by the formation of the sulfate crystals in it.

Lead sulfate is a desirable "porosity salt." It introduces no extraneous element into the battery. Its density is materially lower than that of lead peroxid or metallic lead, and there is accordingly a reduction of volume when the electrolytic forming takes place, with consequent production of pores throughout the mass of formed active material. The advantages of the sulfate are, however, dependent on discriminating use. Too little sulfate will result in a high density plate, likely to buckle or warp when sulfated; too much will make the electrode unduly porous and relatively non-coherent. High density results in low capacity, and non-coherence in rapid deterioration.

It has been proposed to regulate the amount of sulfate by adding to finely-divided lead or a lead oxid paste such an amount of sulfating solution as may be expected to produce the desired quantity of sulfate. In commercial practice this does not give the desired result. A predetermined amount of sulfate can be obtained only by an exact control of the reagents and the conditions of reaction. It is only exceptionally that two batches of lead or lead oxids have identical physical and chemical characteristics. Also, atmospheric temperature, the concentration and temperature of the sulfating solution, the time of reaction, and other variant factors may have a marked effect on the quantity of sulfate formed.

I have discovered that lead sulfate or equivalent lead salt, in crystalline or other suitable solid condition, may be advantageously made as initial ingredient of the composition to be made active. In this way the difficulties above referred to may be avoided and the amount of sulfate exactly controlled. Since it is not necessary nor desirable to form material quantities of lead sulfate in situ in the material, water or dilute electrolyte may be used in making up the pasty mixture for application to the grid. The use of such liquids, instead of strong sulfating solutions, obviates the difficulties which are encountered when reaction takes place during the mixing and pasting steps.

In a preferred form of the present invention, as applied to the manufacture of positive electrodes, lead sulfate in the desired amount is intimately mixed with lower oxids of lead. The materials may be dry. The mixture or blend is worked up with water to a paste of the proper consistency and is then ready to be pasted upon a support.

Litharge or red lead, or a mixture of these oxids, or equivalent lead compounds, may be used with the sulfate. Various modifications of the composition may be made. The following is given, by way of example only, as a suitable mixture.

Per cent.
Lead sulfate ($PbSO_4$)_____   7.0
Litharge ($PbO$)_____  25.0
Red lead ($Pb_3O_4$)_____  68.0
                               _____
                                100

The percentage of sulfate may be varied within rather wide limits. Since as above-mentioned the physical and chemical characteristics of different batches of lead oxids vary more or less, it is advisable to determine by suitable test of a sample from each batch of oxids the percentage of sulfate to be mixed therewith to form the most suitable mixture. For most purposes between 1% and 15% will be used. A small percentage of finely divided metallic lead may be added to increase the conductivity of the mixture and facilitate the peroxidation.

After the electrodes have been pasted with the sulfate-containing composition, they may be placed in a setting bath comprising dilute sulfuric acid or other reagent adapted to form lead sulfate by reaction with the oxids of lead. The crystals of sulfate give sufficient coherence for the succeeding forming step. I have discovered that no crystalline bonding action is necessary prior to setting. The pasty mixture of sulfate and oxids adheres well to the grid, though bonding crystals are not present. In some cases the setting may be omitted, and the bonding compounds produced during the forming operation.

It will be understood that the sulfate content of the composition at the time of application to the grid is one of the principal factors affecting porosity. The quantity of sulfate largely determines the density of the composition, considering pastes of proper plasticity for application to the grids, and hence the amount of combined lead which can be applied to unit grid area under the pressure selected for pasting. Subsequent formation of sulfate does not substantially affect the porosity of the final peroxidized material.

The forming or peroxidation of the composition may be effected by chemical or electrical means in any suitable way. A preferred procedure is to immerse the pasted plates in dilute sulfuric acid and charge them at a relatively low current density.

Compositions of the type described may be reduced to metallic lead for the formation of negative electrodes. Or finely divided metallic lead may be mixed with lead sulfate and subjected to reducing or peroxidizing conditions.

Instead of lead sulfate, other lead salts of less density than metallic lead or lead peroxid may be used, provided they introduce no objectionable element into the battery. Lead sulfate well adapted for the purposes of this invention may be prepared electrolytically from metallic lead, as described in an application of R. C. Benner, or made in other ways. Non-reactive liquids, such as alcohol, may be substituted for water in making up pastes comprising finely divided metallic lead, as described in the application of R. C. Benner et al., Serial No. 650,729, filed July 10, 1923.

I am aware that in the early stages of the art lead sulfate was made an initial constituent of paste compositions for certain special uses. For example, lead peroxid, minium, and lead sulfate or carbonate were mixed with a solution of lead acetate, then molded, baked, and peroxidized. In contradistinction to such processes, this invention is based upon the use, in compositions to be set and formed according to present standard practice, of lead sulfate or equivalent salt prepared prior to incorporation with the other ingredients. In this way the difficulties attending the formation of sulfate in the paste, heretofore considered to be unavoidable, are escaped, and positive advantages are obtained.

I claim:

1. Process of regulating the porosity of storage battery electrodes, comprising preparing a paste embodying as initial ingredients lead containing sulfatable material and a lead compound having a density less than that of the active material to be prepared, the proportion of the said lead compound being varied in accordance with the physical and chemical characteristics of the particular batch of lead-containing sulfatable material used, placing the composition upon a support, and converting the composition into active material.

2. Process of regulating the porosity of storage battery electrodes, comprising determining the physical and chemical characteristics of the particular batch of lead oxid to be used, mixing lead sulfate therewith in such amount as will insure the desired porosity, placing the composition upon a support, and converting the composition into active material.

3. Process of preparing a composition of predetermined lead sulfate content for application to storage battery grids, comprising mixing lead sulfate in the desired amount with a lower oxid of lead and a liquid incapable of producing a substantial amount of lead sulfate by reaction with the oxid.

4. A composition for storage battery electrodes, comprising lead oxids, lead sulfate prepared prior to incorporation in the composition, and water free from substantial amounts of dissolved material.

5. A composition for storage battery electrodes, comprising lead oxids, and lead sulfate prepared prior to incorporation in the composition and constituting between 1% and 15% by weight thereof.

6. A composition for storage battery electrodes, comprising litharge, red lead and from 1% to 15% by weight of lead sulfate.

7. A composition for storage battery electrodes, comprising about 68% by weight of red lead, about 25% of litharge, and about 7% of lead sulfate prepared prior to incorporation in the composition.

In testimony whereof, I affix my signature.

HELEN GILLETTE WEIR.